Aug. 6, 1946.  W. R. RAY  2,405,370
SOLENOID OPERATOR
Filed Jan. 1, 1945
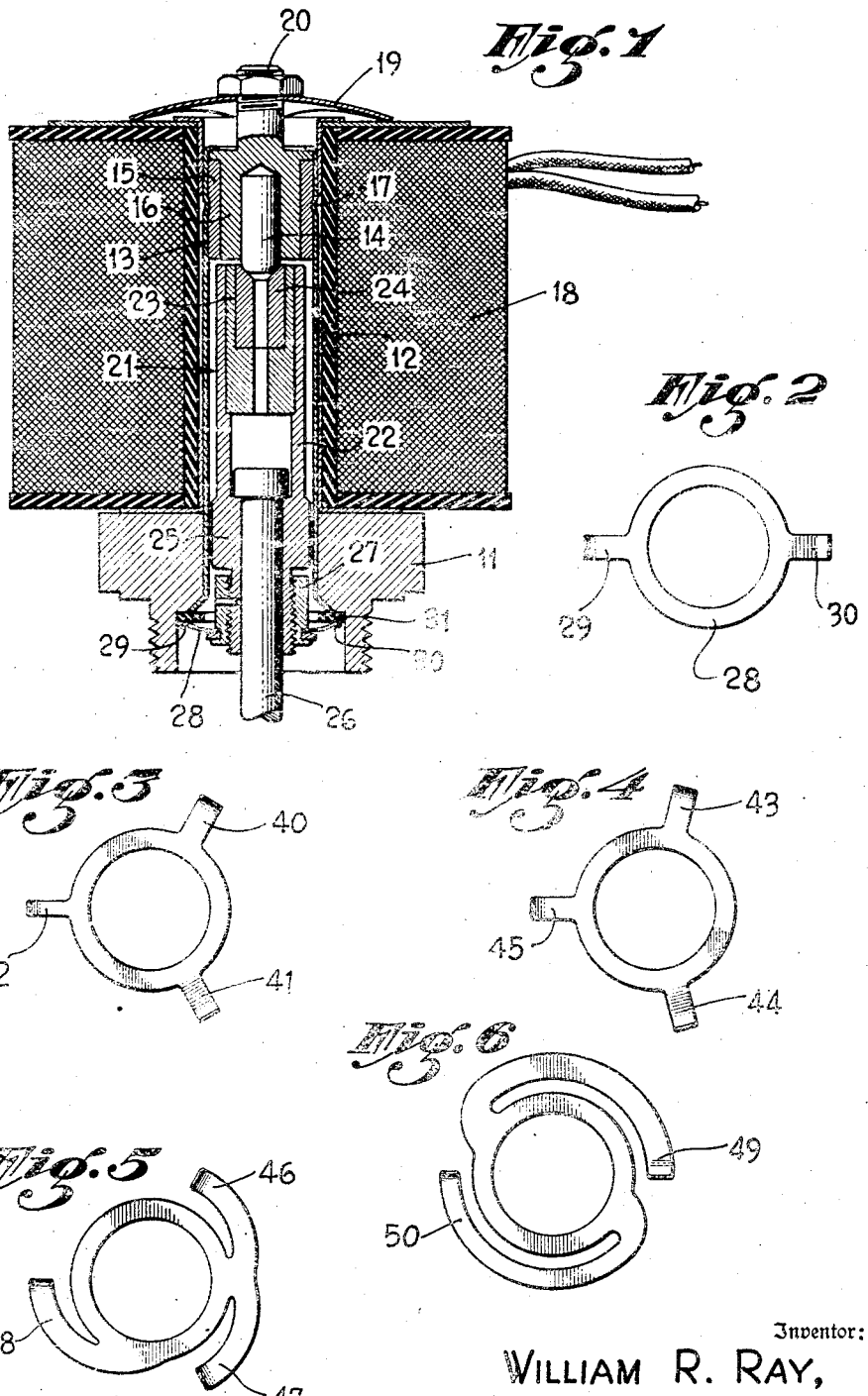
Inventor:
WILLIAM R. RAY,
By John H. Rouse,
Attorney.

Patented Aug. 6, 1946

2,405,370

UNITED STATES PATENT OFFICE 2,405,370

SOLENOID OPERATOR

William R. Ray, Los Angeles, Calif., assignor to General Controls Co., a corporation Application January 1, 1945, Serial No. 570,972

5 Claims. (Cl. 175—341)

My present invention relates to solenoid operators of the type having a reciprocable plunger which, when energized, is attracted into engagement with a stop of magnetizable material. Upon deenergization of such a solenoid there is a tendency for the plunger to be retained in contact with the stop due to the effect of residual magnetism. It is therefore an object of this invention to prevent such magnetic sticking by providing novel means for initiating movement of the plunger out of contact with the stop when the solenoid is deenergized so that the plunger is then free to move under the force of its normal bias.

More specifically, it is an object of the invention to provide resilient fingers, attached to an external portion of the plunger and yieldably engageable with a generally plane surface of the base of the solenoid, for urging the plunger out of contact with the stop.

Another object is to so construct or arrange the fingers that, when the plunger is attracted, an asymmetric force is produced by the fingers which tends to so tilt the plunger that a portion thereof toward its outer end is then in light one-sided engagement with the customary guide sleeve within which the plunger reciprocates.

Another object is to provide, in combination with the means recited in the preceding object, means whereby the inner end of the plunger is spacedly centered in the guide sleeve; such an arrangement having particular utility when the solenoid is energized by alternating current.

Other objects and advantages of the invention will be found in the description, the drawing, and the claims; and, for full understanding of the invention, reference is to be had to the following detailed description and accompanying drawing, wherein:

Figure 1 is a longitudinal sectional view of a solenoid operator embodying the invention;

Figure 2 is an enlarged view, in plan, of the resilient finger ring 28 of Fig. 1; and Figures 3, 4, 5, and 6 are views, similar to that of Fig. 2, of modified forms of finger rings.

In the drawing, the numeral 11 indicates a base member or fitting for mounting the solenoid on a device to be operated. Secured at its lower end in an opening through the base member is a cylindrical sleeve 12, of non-magnetizable material, the bottom end of which is flared to cooperate with a tapered portion of the base opening and is secured thereto by solder. Closing the upper end of the sleeve is a compound stop member 13 comprising inner and outer portions 14 and 15, of magnetizable material, between which is another portion 16 of non-magnetizable material; the stop member being secured to the sleeve by rolling a circumferential portion 17 of the sleeve into a corresponding recess in the periphery of the stop member. Around the sleeve is a hollow coil structure 18 which is clamped to the base 11 by a cupped spring 19 mounted on a stud 20 extending integrally from the stop-member portion 16.

Reciprocable within sleeve 12 is a plunger 21 comprising an outer portion 22, of magnetizable material, the upper end of which is bored to tightly receive a pair of nested cylinders 23 and 24 of non-magnetizable and magnetizable material, respectively. In the top of the plunger is a conical recess cooperable with the rounded extremity of the inner stop portion 14 whereby, when the plunger is in its attracted position as shown, the upper end of the plunger is centered in the sleeve. The general structure so far described, which has particular advantages when the solenoid is energized by alternating current, is disclosed and claimed in my Patents Nos. 2,096,763 and 2,098,195; no further description herein being deemed necessary beyond mention of the fact that the intermediate portions 16 and 23 of the stop member and of the plunger constitute the shading coils usually employed in alternating-current devices.

The plunger outer-portion 22 is generally square in cross section, its corners being rounded to provide considerable clearance between its upper portion and the sleeve, and but slight clearance (in practice about 0.005" diametrically) at its larger lower end 25; the cutting line of the plunger as shown in the drawing being across its corners. Mounted in an opening through the lower portion of the plunger is a stem 26 for connection to a device to be operated; the stem being arranged for limited relative movement with respect to the plunger so that an impact can be applied to the load device when the plunger is attracted.

Threaded on the reduced lower extremity of the plunger is a tubular fitting 27 to which is rigidly secured a finger ring 28, shown per se in Fig. 2. This ring is of thin resilient metal and its fingers 29 and 30 are so formed that they incline slightly toward the upper or inner end of the plunger and are arranged to bear against the plane undersurface of a washer 31 which is a press fit in the enlarged bottom portion of the base member opening. As shown in the drawing, the washer 31 is of nonmetallic material such as fiber or hard rubber; however, it optionally may be of metal.

With the plunger in its attracted position, as shown in the drawing, the fingers 29 and 30 are slightly flexed so that, when the solenoid is deenergized, the force of these fingers is effective to initiate movement of the plunger away from its stop, whereupon it can move under the force of gravity to its released position wherein it is widely separated from the stop.

In the drawing the enlarged portion 25 of the plunger is, for the sake of symmetry, shown as being out of engagement with the side wall of the sleeve; however, in practice, such a condition is never met due to the relatively close fit of this portion in the sleeve, and also because, regardless of how uniform may be the force of the fingers 29—30, they are never sufficiently so that there is a tendency for the lower end of the plunger to be centered in the sleeve. This is particularly true since the fingers incline upwardly and engage washer 31 at points thereon spaced by a considerable distance from the plunger, rather than at the edge of the opening in the washer.

In practice it has been found advantageous to so construct or arrange the fingers that the forces produced thereby are asymmetric and therefore tend slightly to tilt the plunger even though the surface with which the fingers engage is plane. This effect is more apparent if one considers an arrangement wherein but a single finger is employed.

In Figs. 3, 4, 5, and 6 are shown various forms of rings wherein the fingers are constructed or arranged to produce such asymmetric forces. In Fig. 3 there are three radial fingers 40, 41, and 42; the fingers being equally spaced, finger 42 however being narrower than the other fingers. The fingers 43, 44, and 45 of the ring shown in Fig. 4 are of equal width and strength but are unequally spaced. In Fig. 5, the fingers 46, 47, and 48 extend generally tangentially from the periphery of the ring portion, the fingers being of equal width and terminating at equally-spaced points; finger 46, however, extending in a direction opposite to that of the other fingers. In Fig. 6, the two fingers 49 and 50 are arranged generally circumferentially around the ring and their extremities are equally spaced; however, the fingers are of different widths and hence exert correspondingly different forces.

The specific structure shown is especially adapted for use when alternating current is employed as the source of energy since, by lightly urging the lower portion 25 of the plunger into one-sided engagement with the sleeve and by spacedly centering the top end of the plunger, lateral vibration of the plunger, which might produce an undesirable hum, is prevented.

The embodiments of my invention herein shown and described are obviously susceptible of modification without departing from the spirit of the invention, and I intend therefore to be limited only by the scope of the appended claims.

I claim as my invention:

1. In a solenoid: a base member, a sleeve mounted at one of its ends in an opening through said base member, an elongated plunger freely reciprocable in said sleeve, an energizing coil around the sleeve for attracting the plunger thereinto, stop means of magnetizable material on the sleeve and engageable by the inner end of the plunger when said coil is energized, and means for ensuring release of the plunger from the stop means when the coil is deenergized comprising a plurality of fingers extending laterally from an outer portion of the plunger and yieldably engageable with the base member at a side thereof away from the sleeve, said fingers being so constructed and arranged that the operative force of at least one of the fingers is different to that of another.

2. A solenoid, as defined in claim 1, wherein the surface of said side of the base member engageable by the fingers is in a plane substantially at right-angles to the axis of the plunger.

3. In a solenoid: a base member, a sleeve mounted at one of its ends in an opening through said base member, an elongated plunger freely reciprocable in said sleeve and having a portion extending outwardly of said one of the ends thereof, an energizing coil around the sleeve for attracting the plunger within the sleeve, means of magnetizable material closing the other of the ends of the sleeve and forming a stop engageable by the plunger when it is attracted, and means for ensuring release of the plunger from said stop when the coil is deenergized comprising a plurality of resilient fingers extending laterally from said outward portion of the plunger and yieldably engageable, when the plunger is attracted, with a surface of the base member at the side thereof opposite to the sleeve, said fingers being so constructed and arranged that the force applied to the base-member surface by at least one of the fingers differs from that of another, said base-member surface being in a plane substantially at right-angles to he axis of the sleeve and plunger, said fingers being engageable with said surface only at points thereon spaced from the inner surface of the side wall of the sleeve.

4. In a solenoid: a base member, a sleeve mounted at one of its ends in an opening through said base member, an elongated plunger freely reciprocable in said sleeve and having a portion extending outwardly of said one of the ends thereof, an energizing coil around the sleeve for attracting the plunger within the sleeve, means of magnetizable material closing the other of the ends of the sleeve and forming a stop engageable by the plunger when it is attracted, and means for ensuring release of the plunger from said stop when the coil is deenergized comprising a plurality of resilient fingers extending laterally from said outward portion of the plunger and yieldably engageable, when the plunger is attracted, with a surface of the base member at the side thereof opposite to the sleeve, said fingers being so asymmetrically constructed or arranged that the operative force exerted by the fingers tends to tilt the plunger, said base-member surface being in a plane substantially at right-angles to the axis of the sleeve and plunger, said fingers being engageable with said surface only at points thereon spaced from the inner surface of the side wall of the sleeve.

5. In a solenoid: a base member, a sleeve mounted at one of its ends in an opening through said base member, an elongated plunger reciprocable in said sleeve and having a portion extending outwardly of said one of the ends thereof, an energizing coil around the sleeve for attracting the plunger within the sleeve, means of magnetizable material closing the other of the ends of the sleeve and forming a stop engageable by the plunger when it is attracted, the inner end portion of the plunger having a loose fit within the sleeve, said stop cooperating with the inner end of the plunger to center the same within the sleeve, the plunger being enlarged toward its outer end so as to fit the sleeve relatively closely, and means for ensuring release of the plunger from said stop when the coil is deenergized comprising a plurality of resilient fingers extending laterally from said outward portion of the plunger and yieldably engageable, when the plunger is attracted, with a surface of the base member at the side thereof opposite to the sleeve, said fingers being so formed that they incline toward the inner end of the plunger, said fingers further being so asymmetrically constructed or arranged that the operative force exerted by the fingers tends to so tilt the plunger that said enlarged portion thereof is held in one-sided engagement with the sleeve.

WILLIAM R. RAY.